(12) United States Patent
Denecheau et al.

(10) Patent No.: US 6,925,080 B2
(45) Date of Patent: Aug. 2, 2005

(54) METHOD OF UPDATING AN INVERSE ARP TABLE IN AN IP NETWORK OVER A PARTIALLY MESHED FRAME RELAY NETWORK

(75) Inventors: Lionel Denecheau, La Colle sur Loup (FR); Denis Esteve, Vence (FR); Pascal Thubert, Vence (FR)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 10/053,242

(22) Filed: Oct. 26, 2001

(65) Prior Publication Data
US 2002/0147844 A1 Oct. 10, 2002

(30) Foreign Application Priority Data
Oct. 27, 2000 (FR) .......................................... 00 480099

(51) Int. Cl.[7] .............................................. H04L 12/56
(52) U.S. Cl. ...................................... 370/392; 370/406
(58) Field of Search ................................. 370/392, 406

(56) References Cited
U.S. PATENT DOCUMENTS
6,188,671 B1 * 2/2001 Chase et al. ................. 370/232

2002/0051459 A1 * 5/2002 Denecheau et al. .......... 370/409
2002/0147844 A1 * 10/2002 Denecheau et al. .......... 709/245
2003/0161328 A1 * 8/2003 Chase et al. ............. 370/395.52
2004/0194102 A1 * 9/2004 Neerdaels .................... 718/100

* cited by examiner

Primary Examiner—Melvin Marcelo
(74) Attorney, Agent, or Firm—Douglas W. Cameron; Anne Vachon Dougherty

(57) ABSTRACT

A method of updating an inverse ARP table in an IP network over a partially meshed Frame Relay network (10) wherein the Frame Relay network includes at least a hub (12 or 14) which is linked to each one of a set of spokes (16, 18, 24 or 20, 22, 24) by a Permanent Virtual Circuit (PVC) identified by a first Data Link Connection Identifier (DLCI) associated with the hub and a second DLCI associated with the spoke, the hub and the set of spokes defining an IP subnet having a subnet address, and each spoke having an inverse ARP table in which the first DLCI identifying a PVC is mapped with the IP address of the hub as entry. The method comprises automatically entering an entry into the inverse ARP table which defines the first DLCI being mapped with a default IP address identifying the hub as destination for any frame addressed to one or several spokes of the subnet.

15 Claims, 2 Drawing Sheets

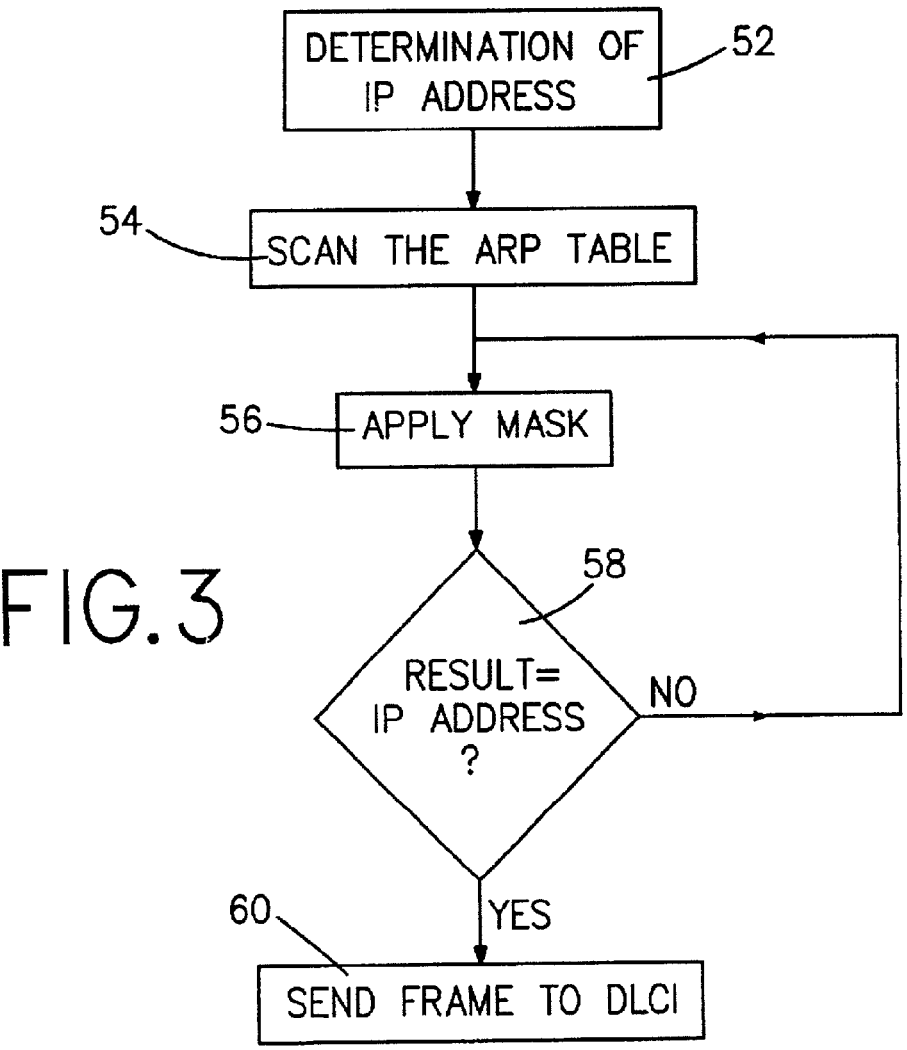

METHOD OF UPDATING AN INVERSE ARP TABLE IN AN IP NETWORK OVER A PARTIALLY MESHED FRAME RELAY NETWORK

FIELD OF THE INVENTION

The present invention relates to the Frame Relay networks wherein the IP protocol is used on top of the Frame Relay networks, and relates in particular to a method of updating an inverse ARP table in an IP network over a partially meshed Frame Relay network.

BACKGROUND OF THE INVENTION

The introduction of intelligent workstations, which are usually LAN-attached, has changed the data processing paradigm from centralized host computing to distributed processing. Also, with the growth of distributed processing, the need for LAN interconnection and the growing use of graphics and images has lead to exponentially increasing network traffic. Furthermore, not only the demand for connectivity has changed, but also the technology to provide networking facilities has been subjected to important changes. The introduction of digital and fiber technologies provides faster and more reliable communication but requires networking techniques which are able to efficiently operate at higher speeds. In order to meet this requirement, the concept of fast packet switching has been developed.

Fast packet switching, often used to refer to Frame Relay, is a generic term that relates to packet switching technologies that omit most of OSI model layer 2 processing and all of layer 3 to 7 processing to achieve higher data throughput. Because fast packet switching such as Frame Relay operates below layer 3 of the OSI model, it is easy to run multiple protocols over it, in particular the IP protocol.

The Frame Relay network provides a number of Permanent Virtual Circuits (PVC) that form the basis for the connections between stations attached to the network and that allow data exchange between these stations. The resulting set of interconnected devices is the Frame Relay group which may be either fully interconnected to form a fully meshed network, or only partially interconnected to form a partially meshed network. In either case, each PVC is uniquely identified at each Frame Relay interface by a Data Link Connection Identifier (DLCI). Such a DLCI, which is therefore different on either end of the PVC, has strictly local significance at each interface.

A fully meshed Frame Relay network is not subject to connectivity problems. In the IP configuration, the whole network is seen as a single IP subnet. This configuration has no limitation since any router can reach all other routers, except that it requires a high number of PVCs, which number increases as each a new router is added to the network.

Generally, the mapping between the IP addresses of the routers in the IP subnet and the DLCIs to be used by a router to reach each one of the other routers is achieved by using an inverse ARP (Address Routing Packet) table associated with the router. The dynamic method for updating the inverse ARP table consists for a router in sending or receiving requests over a PVC, bearing in mind that the known hardware address is the DLCI corresponding to the router end. When receiving either a reply to an ARP request or a request over the PVC, the router can associate, in its inverse ARP table, the IP address (as entry) of the device at the other end of the PVC with the DLCI being used. Since a fully meshed network is seen as a single IP subnet and since any router has PVC connectivity to all other routers in such a network, it can dynamically map the remote IP address-to-DLCI using the inverse ARP method.

Partially meshed networks can be made of several IP subnets wherein one router, the hub, has a PVC for all other routers of the subnet, the spokes. In such a case, spoke to spoke connectivity is resolved via IP subnet to subnet connectivity, which is the normal IP routing process. When a spoke wants to reach another spoke of another subnet, it will use its routing table which indicates a route via the hub. The problem with this method is that it requires a different IP subnet per PVC. This can be a problem in case of IP address exhaustion. It also creates very large routing tables, because of the number of new subnets, which causes memory problems inside the routers along with high bandwidth utilization between the links when exchanging the routes for these subnets. Partially meshed networks can also be made of one single subnet. In that case, dynamic inverse table does not permit resolution of the spoke to spoke connectivity problem.

The solution to the above problems consists in doing for each spoke a manual static mapping instead of using the dynamic inverse ARP. This means that the inverse ARP table is manually configured with the IP addresses of all the spokes and the corresponding DLCIs. Unfortunately, such a solution which has to be achieved on all the spokes, can become very heavy and difficult when many spokes are present in the network.

SUMMARY OF THE INVENTION

Accordingly, it is an object of the invention to achieve a method of dynamically updating the inverse ARP table of each spoke of an IP network over a partially meshed Frame Relay network whereby it is not required to enter manually any entry in the table.

The foregoing and other objects are realized by the present invention comprising a method for updating an inverse ARP table in an IP network over a partially meshed Frame Relay network wherein the Frame Relay network includes at least a hub which is linked to each one of a set of spokes by a Permanent Virtual Circuit (PVC), the PVC being identified by a first Data Link Connection Identifier (DLCI) associated with the hub and a second DLCI associated with the spoke. The hub and the set of spokes define an IP subnet having a subnet address. Each spoke has an inverse ARP table in which the first DLCI identifying a PVC is mapped with the IP address of the hub as an entry. The method consists in automatically entering an entry into the inverse ARP table which defines the first DLCI being mapped with a default IP address identifying the hub as the destination for any frame addressed to one or several spokes of the subnet.

BRIEF DESCRIPTION OF THE DRAWINGS

The above and other objects, features and advantages of the invention will be better understood by reading the following more particular description of the invention in conjunction with the accompanying drawings wherein:

FIG. 2 is a schematic representation of the inverse ARP table of a spoke comprising only dynamic entries according to the method of the invention.

FIG. 3 is a flow chart representing the different steps used when a new frame received in the spoke is to be transmitted to an IP address.

DETAILED DESCRIPTION OF THE INVENTION

Figure 1:
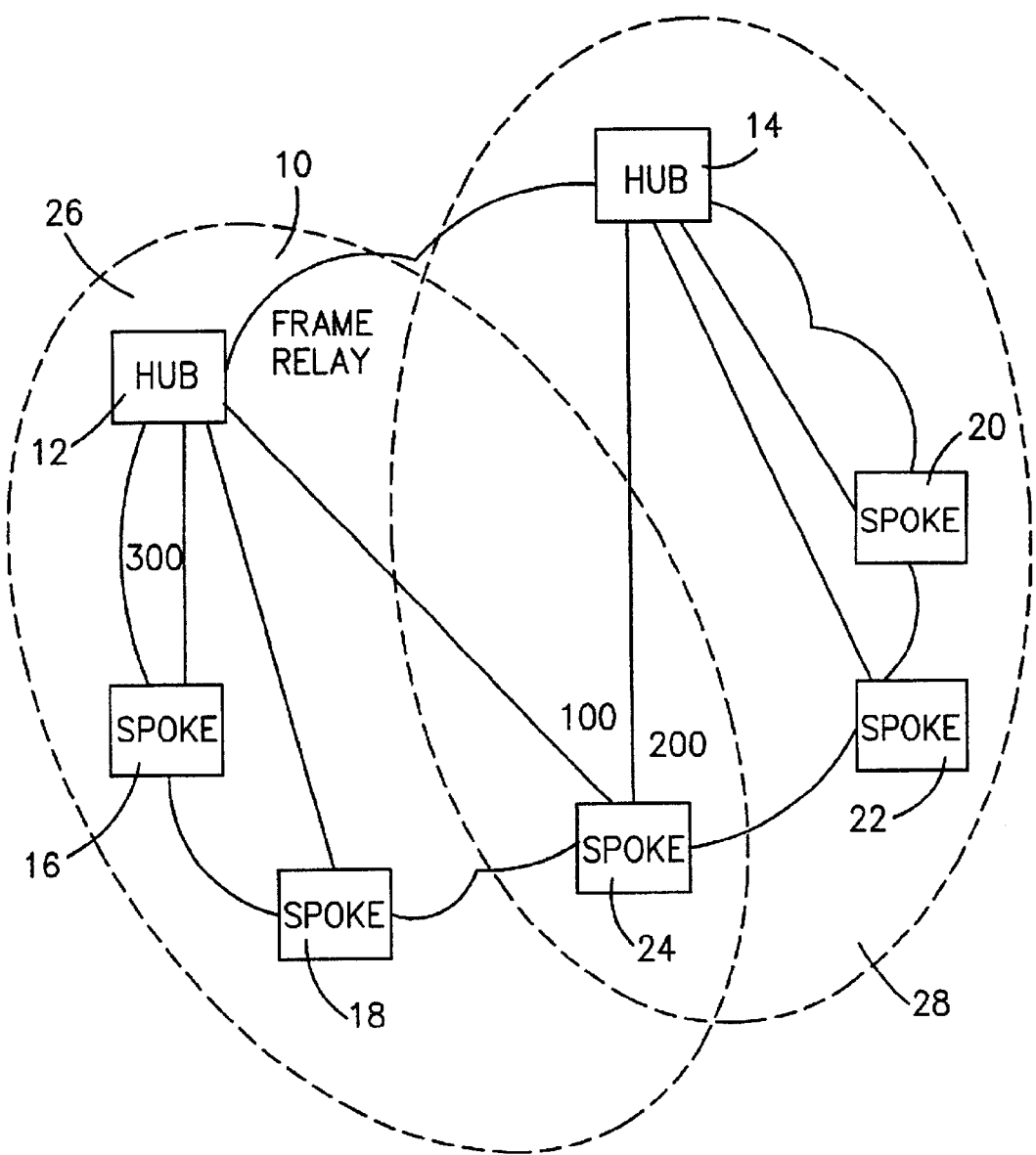
FIG. 1 is a Block-diagram representing an IP network over a Frame Relay including two subnets wherein the invention is implemented.

Referring to FIG. 1, an IP network over a Frame Relay wherein the invention is implemented comprises a partially meshed Frame Relay including two hub routers 12 and 14 (called hubs in the following) and a plurality of gateways (called spokes in the following). Spokes 16 and 18 are linked to hub 12 whereas spokes 20 and 22 are linked to hub 14. Spoke 24 is linked to both hub 12 and 14. While the system illustrated in FIG. 1 is an example, it must be understood that a plurality of spokes (may be more than 50) could be linked to each hub.

Each link corresponds to a Permanent Virtual Circuit (PVC) in the Frame Relay 10 and is assigned a Data Link Connection Identifier (DLCI). Thus, spoke 24 is linked to hub 12 by DLCI 100 whereas spoke 24 is linked to hub 14 by DLCI 200.

According to the principles of the invention, Frame Relay 10 is used in an IP network. Since there are two hubs, the IP network includes a first subnet 26 including hub 12 and spokes 16, 18, 24 and a second subnet 26 including hub 14 and spokes 20, 22, 24. Note that more than two subnets could exist in the system without being out of the scope of the invention.

In a general way, the address of a spoke comprises the subnet address followed by a subnet mask such as 255.255.255.X which enables determination of the specific spoke address. As an example, it is assumed that the addresses in the first subnet are 10.1.1.X with X being the specific address of each spoke in the subnet and the addresses in the second subnet address are 10.2.2.Y with Y being the specific address of each spoke in the subnet. Thus, the addresses of the spokes in the first subnet 26 could be:

spoke 24→10.1.1.1
hub 12→10.1.1.2
spoke 20→10.1.1.3
spoke 22→10.1.1.4

And, the addresses of the spokes in the second subnet 28:

spoke 24→10.2.2.1
hub 14→10.2.2.2
spoke 22→10.2.2.3
spoke 24→10.2.2.4

As already explained, each spoke has an inverse ARP table including the DLCI to be used for each IP address used as an entry of the table. Today, such a table includes two parts, one part containing the dynamic entries and a second part containing the static entries.

Whereas the dynamic entries are automatically updated, the static entries are manually entered by the operator. The static entries correspond normally to the DLCIs which are to be used when the spoke wants to establish a connection with another spoke. Thus, assuming that a connection from spoke 24 to spoke 16 is to be established, the route is to use DLCI 100 linking spoke 24 to hub 12 and then DLCI 300 linking hub 12 to spoke 16. Therefore, the static entry to be set in the table would be DLCI 100 corresponding to the IP address 10.1.1.2 of hub 12. Assuming that the system includes a great number of spokes, it would be required to write an entry for each spoke into the inverse ARP table.

According to the method of the invention, there are no more static entries as illustrated in FIG. 2. The essential feature of the invention is to write only one dynamic entry for each subnet of the system. This entry is any IP address by default giving the DLCI linking the spoke to the hub. Such a default IP address may be the address of the subnet wherein the last part identifying the spoke is replaced by 0. Thus, in the present example there are two entries as shown in FIG. 2. The first entry is the IP address 10.1.1.0 corresponding to DLCI 100 linking spoke 24 to hub 12 whereas the second entry is the IP address 10.2.2.0 corresponding to DLCI 200 linking 24 to hub 14. It must be noted that the default IP address to be entered could be 0.0.0.0. if the system includes a single subnet.

The entries can be updated in the inverse ARP table whenever the spoke or the hub is activated or can be updated periodically. According to the inverse ARP procedure, the update occurs when an inverse ARP request is sent from the hub to the spoke or when receiving the reply to an inverse ARP request from the spoke to the hub. While this procedure remains unchanged, the hub will transmit a default address corresponding to the subnet (e.g. 10.1.1.0) instead of its IP address in the ARP advertisement.

As the result of the above description, the IP address 10.1.1.0 is now the default layer 2 route for reaching any spoke of subnet 26, and IP address 10.2.2.0 is now the default layer 2 route for reaching any spoke of subnet 28. Thus, when hub 12 receives a frame from a spoke of subnet 26, it forwards it directly at layer 2 without passing the frame to the IP level.

Further to be used for forwarding a frame to any spoke of the subnet, the hub is also responsible for handling the broadcast or limited broadcast of frames as explained hereunder. When a frame is to be broadcast to all spokes of the subnet, its target IP address is the IP address of the subnet, for example 10.1.1.0 for subnet 26. The frame destined to all spokes of the subnet, is routed across the IP network to the target subnet and broadcast locally on the subnet when it arrives there. In the prior systems, when a spoke receives a directed broadcast from any other interface, it passes the frame to the interface where the destination subnet resides. Then the network interface broadcasts the frame to all spokes of the subnet in a network dependent manner. On the other (receiving) side, as the frame comes from the network interface that holds the subnet, the spoke keeps it for local delivery. For a limited broadcast originated from a local application and destined to any spoke that the port can reach, the frame must not be routed by receiving end as opposed to network directed broadcast. In this case, the receiving end passes the frame to the IP layer which delivers it to a local application.

In the system according to the invention and contrary to the prior technique, the hub which receives a subnet-directed broadcast or a limited broadcast from a spoke of the subnet keeps it for local delivery and also copies it to all the spokes belonging to the subnet. As a result, the broadcast is now handled under the sole responsibility of the hub for that subnet. Therefore, as opposed to the prior technique, the hub also performs the broadcast at layer 2 for frames coming from the spokes. Besides, unless the frame comes from the hub itself, in which case they use it for local delivery, the spokes just forward the broadcast frame to the hub without copying them for themselves.

To forward a frame to the hub, the steps performed in a spoke are illustrated in FIG. 3. When a frame is received, the spoke determines the IP address in the header of the frame (step 52). Then, a scanning process is made in the table (step 54). It must be noted that each entry is associated with a mask. When examining an entry of the table, the process applies the associated mask (step 56). Such a mask is generally 255.255.255.0 such that the application of the mask on the IP address of a spoke belonging to a subnet results in the address of the subnet. Thus, the application of the mask 255.255.255.0 on the IP address 10.1.1.6 of a spoke of subnet 26 results in 10.1.1.0 which is the IP address of said subnet. At this stage, it is determined whether the result corresponds to the entry of the table being scanned (step 58). If not, the application of the mask is repeated for the next entry in the table and so on. If there is correspondence, the frame is sent to the hub by using the DLCI associated with the entry (step 60).

It must be noted that, when there is only one subnet, the default IP address could be 0.0.0.0, as already mentioned. In such a case, the mask to be applied to the IP address of the frame is also 0.0.0.0.

Note that a backup hub can be configured if it has a full connectivity to all spokes of the subnet. But it will not act as a hub unless it loses the connectivity to the primary hub. Upon such an event received from the Local Management Interface of the Frame Relay network, the backup hub signals itself by sending an inverse ARP request, with the source IP address being the default IP address to be used for the subnet (e.g. 10.1.1.0) in the form of a gratuitous inverse ARP, and then takes over the hub role. When the primary hub comes back on, the primary hub does the same and gets the default IP address for itself.

What is claimed is:

1. A method of updating an inverse ARP table in an IP network over a partially meshed Frame Relay network wherein the Frame Relay network includes at least one hub which is linked to each one of a plurality of spokes by a Permanent Virtual Circuit (PVC), said PVC being identified by a first Data Link Connection Identifier (DLCI) associated with said hub and a second DLCI associated with said spoke, said hub and said set of spokes defining an IP subnet having a subnet address, and each spoke having an inverse ARP table in which said first DLCI identifying a PVC is mapped with the IP address of said hub as entry, said method comprising the steps of:

defining said first DLCI being mapped with a default address identifying said hub as the destination for any frame addressed to one or more spokes on said subnet; and automatically entering said default address as an entry into said inverse ARP table.

2. The method of updating an inverse ARP table according to claim 1, wherein said default IP address entered into said inverse ARP table is the IP address of said subnet.

3. The method of updating an inverse ARP table according to claim 1, wherein said default IP address entered into said inverse ARP table is a specific IP address when there is a single subnet in which all the spokes are linked to said hub.

4. The method of claim 1 further comprising the step of forwarding any frame received from a spoke of said subnet directly to the destination without passing said frame to the IP layer when said destination is another spoke of said subnet.

5. The method of claim 1 further comprising the step of broadcasting any broadcast frame received from a spoke of said subnet directly to all the spokes of said subnet without passing said frame to the IP layer.

6. The method of claim 1 wherein said network further comprises a backup hub for said subnet, said backup hub being linked to all spokes of said subnet and to the primary hub, said method further comprising said backup hub sending an inverse ARP request to each spoke with a source IP address being said default address to be used for said subnet.

7. An IP network over a partially meshed Frame Relay network comprising:

at least one hub which is linked to each one of a plurality of spokes by a Permanent Virtual Circuit (PVC), said PVC being identified by a first Data Link Connection Identifier (DLCI) associated with said hub and a second DLCI associated with said spoke, said hub and said set of spokes defining an IP subnet having a subnet address, and each spoke having an inverse ARP table in which said first DLCI identifying a PVC is mapped with the IP address of said hub as entry; and means for defining said first DLCI being mapped with a default address identifying said hub as the destination for any frame addressed to one or more spokes on said subnet and for automatically entering said default address as an entry into said inverse ARP table.

8. The IP network of claim 7 wherein said hub comprises means for forwarding any frame received from a spoke of said subnet directly to the destination without passing said frame to the IP layer when said destination is another spoke of said subnet.

9. The IP network of claim 7 wherein said hub comprises means for broadcasting any broadcast frame received from a spoke of said subnet directly to all the spokes of said subnet without passing said frame to the IP layer.

10. The IP network of claim 7 further comprising a backup hub for said subnet, said backup hub being linked to all spokes of said subnet and to the primary hub, and said backup hub being not active as long as it does not lose the connectivity with said primary hub.

11. The IP network of claim 10, wherein said backup hub sends an inverse ARP request to each spoke with a source IP address being said default IP address to be used for said subnet.

12. The IP network of claim 8 further comprising a backup hub for said subnet, said backup hub being linked to all spokes of said subnet and to the primary hub, and said backup hub being not active as long as it does not loose the connectivity with said primary hub.

13. The IP network of claim 12, wherein said backup hub sends an inverse ARP request to each spoke with a source IP address being said default IP address to be used for said subnet.

14. The IP network of claim 9 further comprising a backup hub for said subnet, said backup hub being linked to all spokes of said subnet and to the primary hub, and said backup hub being not active as long as it does not loose the connectivity with said primary hub.

15. The IP network of claim 14, wherein said backup hub sends an inverse ARP request to each spoke with a source IP address being said default IP address to be used for said subnet.

* * * * *